United States Patent [19]

Kleykamp et al.

[11] 4,434,436
[45] Feb. 28, 1984

[54] ADDRESSABLE PREMIUM CHANNEL OBFUSCATION DEVICE FOR CABLE TELEVISION SYSTEMS

[75] Inventors: Gayheart C. Kleykamp, Ahwatukee; Sam Goldwater; Charles L. Salsbery, both of Phoenix, all of Ariz.

[73] Assignee: Bruce Merrill, Scottsdale, Ariz.

[21] Appl. No.: 282,930

[22] Filed: Jul. 13, 1981

[51] Int. Cl.³ .......................... H04N 7/16; H04K 1/02
[52] U.S. Cl. ..................................... 358/118; 358/117; 358/122
[58] Field of Search ............... 358/114, 117, 118, 122, 358/123

[56] References Cited

U.S. PATENT DOCUMENTS

| | | | |
|---|---|---|---|
| 3,668,307 | 6/1972 | Face et al. | 358/114 |
| 3,896,262 | 7/1975 | Hudspeth et al. | 358/118 |
| 3,997,718 | 12/1976 | Ricketts et al. | 358/122 |
| 4,222,067 | 9/1980 | Stern et al. | 358/118 |

Primary Examiner—S. C. Buczinski
Attorney, Agent, or Firm—Cahill, Sutton & Thomas

[57] ABSTRACT

An obfuscation device for use in cable television systems includes a memory for storing a plurality of channel status bits. The state of each channel status bit corresponds to the authorization or non-authorization of a particular channel. The obfuscation device includes a circuit for selecting a number representing a frequency and a circuit for generating an obfuscation signal that randomly varies about the selected frequency. The obfuscation device uses the selected number to address a location of the memory to fetch the channel status bits corresponding to the respective residences for the channel in which the selected obfuscation frequency lies. The fetched status bits are applied at random time in a predetermined gating period to gating circuits that enable the generated obfuscation signal to be superimposed randomly, with respect to timing, on the program signal of the channel in which the obfuscation frequency lies to obfuscate the television picture received by viewers of television sets in the residences not authorized to receive the channel in which the obfuscation frequency lies.

23 Claims, 10 Drawing Figures

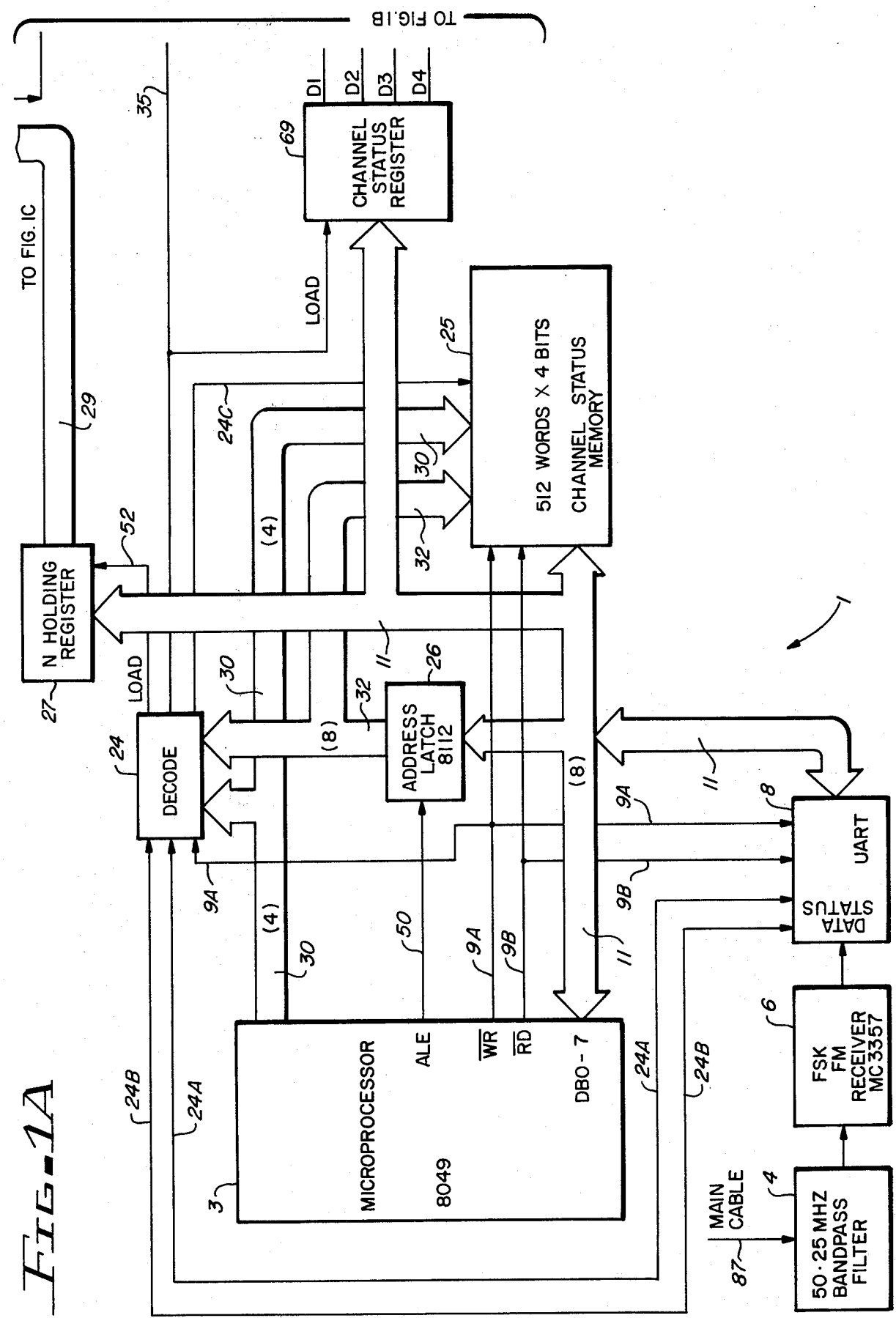

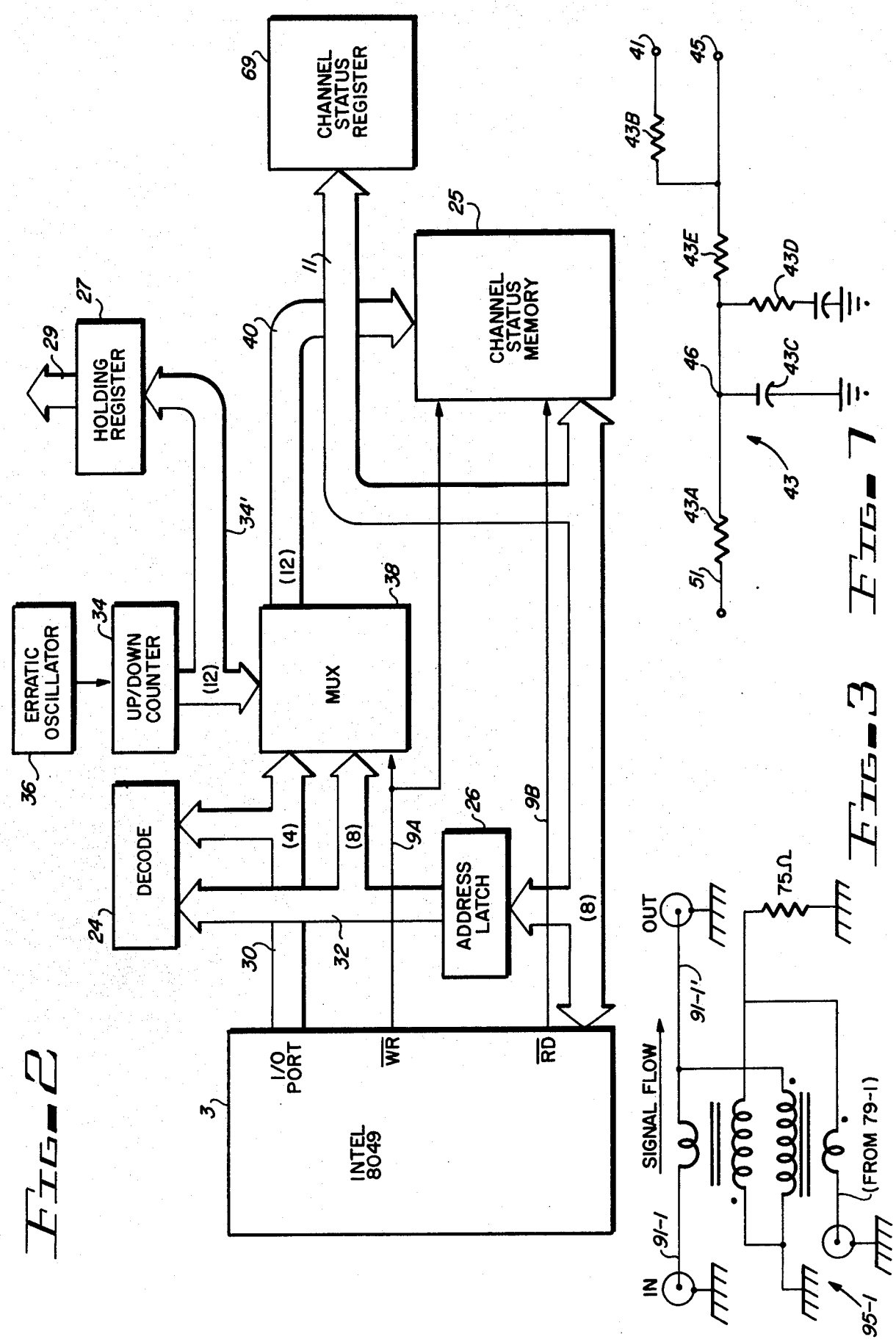

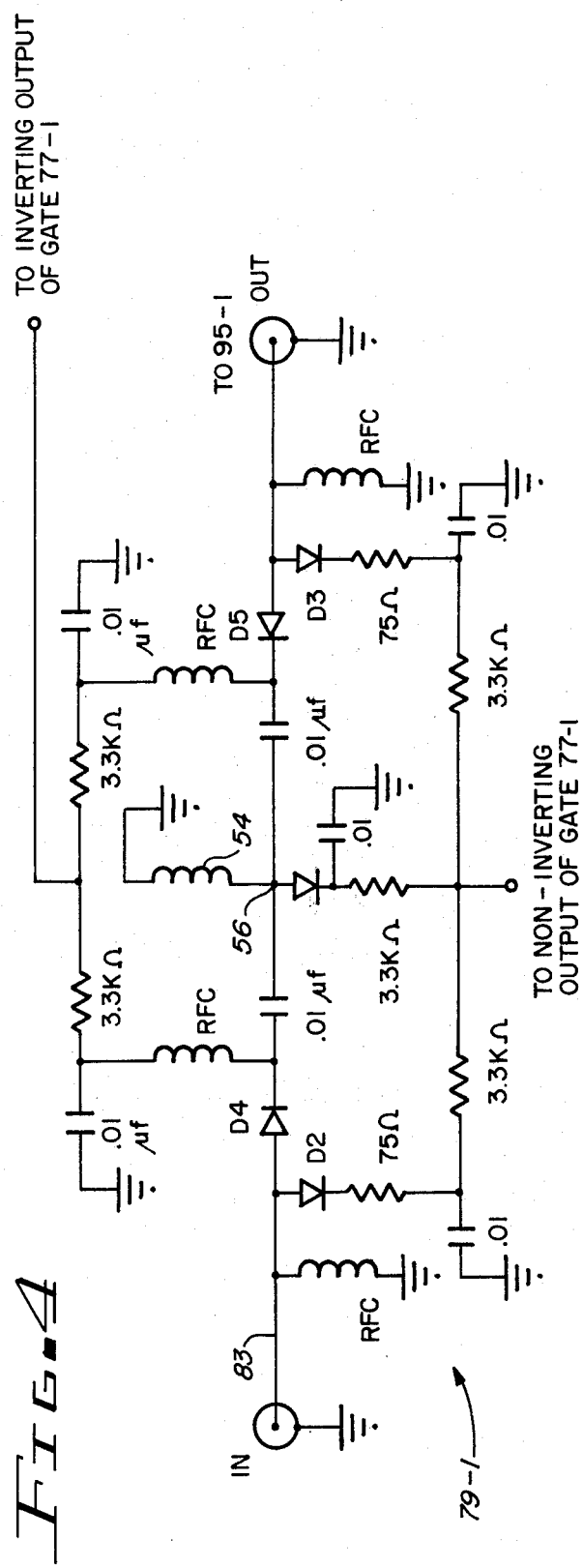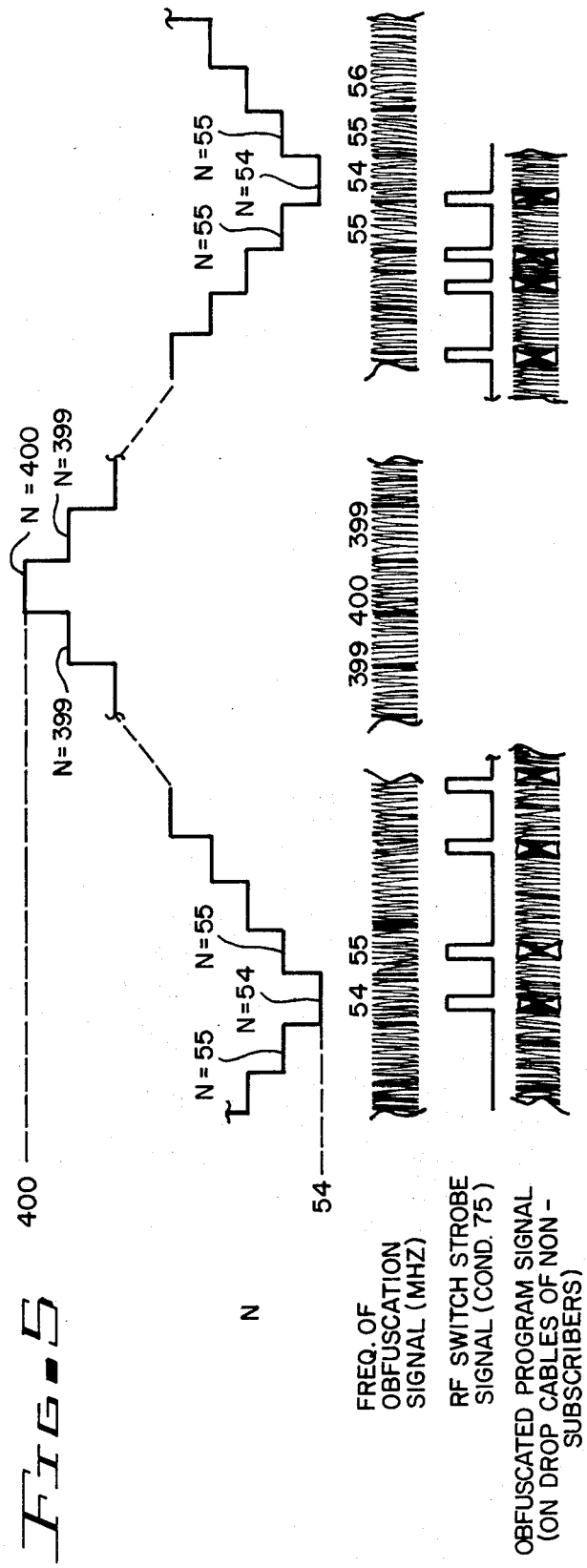

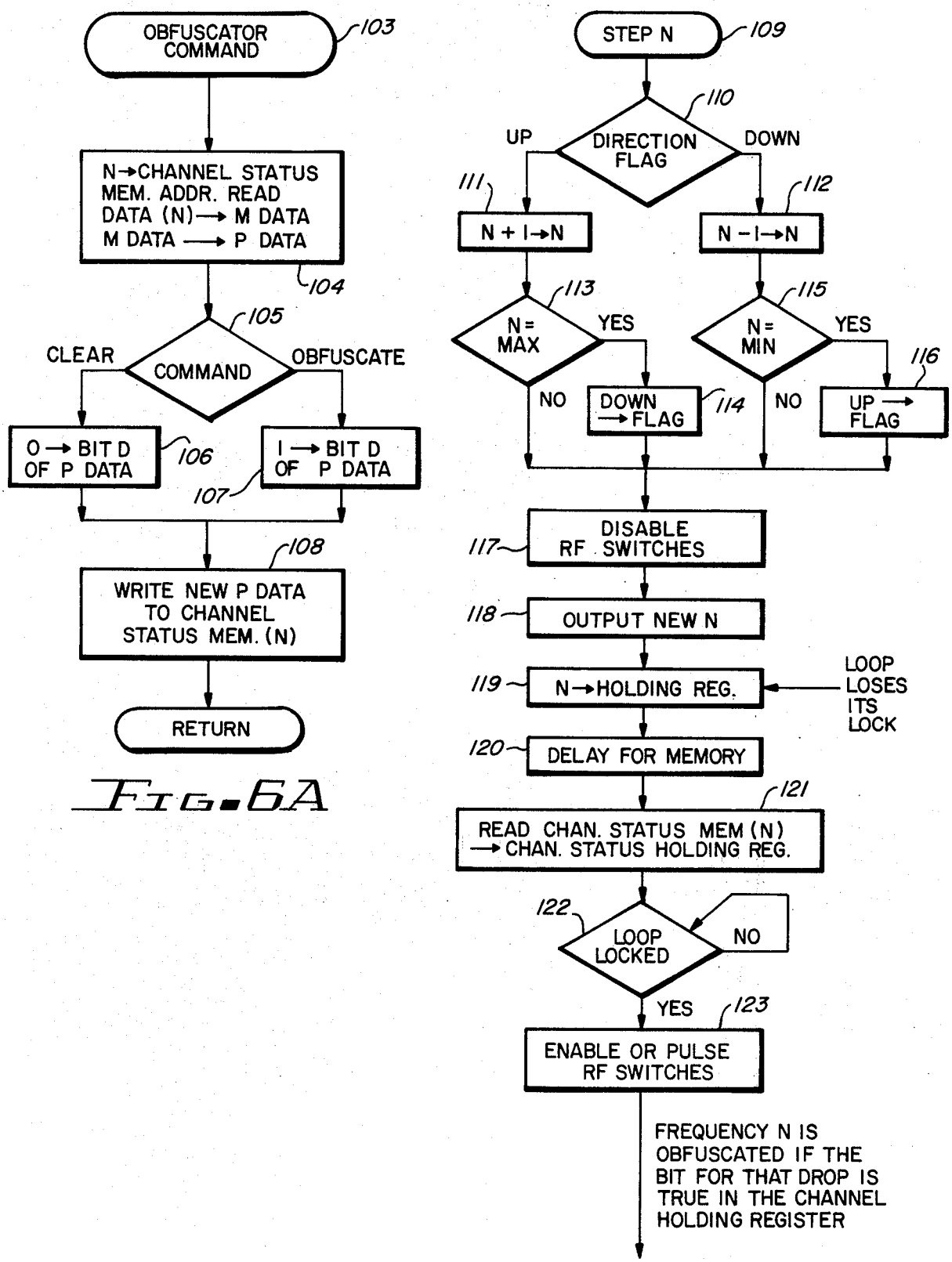

ADDRESSABLE PREMIUM CHANNEL OBFUSCATION DEVICE FOR CABLE TELEVISION SYSTEMS

BACKGROUND OF THE INVENTION

The invention relates to devices for preventing piracy (by unauthorized receivers) of television programs on "premium channels".

A number of cable television companies provide several kinds of service, one kind of service being referred to as "basic service" and another kind being referred to as "premium service". Drop cables coupled to a main cable are routed into a subscriber's residence and are coupled to the antenna inputs of a subscriber's television set. The "basic service" allows the subscriber to see high quality images on his television set for certain predetermined channels. Encoded program signals for other channels, referred to as "premium channels", are conducted on the same drop cables to the subscriber's television set. However, the resulting images that appear to a subscriber who is not authorized to receive the premium channels appear to be obfuscated. If a subscriber to the basic service pays an additional subscription fee for authorization to receive the premium channels, a decoding or filtering device is coupled between the subscriber's drop cable and the antenna inputs of his television set. The decoding or filtering device causes clear, unobfuscated images of the program on the premium channels to appear on the screen of the television set when the subscriber "tunes in" to premium channels.

A number of electronic devices have been devised by electronics amateurs and others to decode premium channel program signals that have been encoded or otherwise obfuscated, thereby allowing one who subscribes only to the basic service to watch the premium channels without paying the subscription fee therefor. In some cases, the decoding devices can even allow individuals who do not subscribe to the basic service to "pirate" the premium channel programs. Low cost premium channel decoding devices have been widely sold by certain electronics companies, making it very easy for many individuals to watch programs on premium channels without payment of the premium channel subscription fee. The widespread piracy of premium channel program signals obviously reduces the amount of revenue collected by cable television companies, and thereby increases the cost of premium channel service to those honest subscribers who pay the premium channel subscription fee. This situation inevitably has slowed the growth of cable television services and has reduced the availability of high quality cable television services to the public.

Thus, there is presently an unmet need for a piracy prevention device for cable television systems that can effectively frustrate the efforts of electronically skillful would-be pirates to obtain, without authorization, premium channel programs intended to be available only to authorized subscribers.

Therefore, it is a primary object of the invention to provide a piracy prevention device and method for preventing even electronically skilled would-be pirates from obtaining a sufficient amount of information from premium channel program signals to enable the would-be pirates to obtain acceptable images of premium channel programs.

Past experience has proved that persons skilled in the electronics art often are highly ingenious at finding ways of accurately decoding or otherwise recovering obfuscated premium channel program signals that enable such persons to obtain acceptable images of premium channel programs and thereby avoid paying the subscription fee therefor. The success of such electronically skilled persons is due in large measure to the fact that the encoded or otherwise obfuscated premium channel signals have been available within the residences of the would-be pirates, so that their activities could be carried out in relative secrecy, and is also due in large measure to the fact that the encoding and obfuscation methods that have been utilized are quite straightforward, such that the encoded or obfuscated signals can easily be synchronized with the circuitry of the television set.

Therefore, another object of the invention is to provide a piracy prevention device and method that avoids delivery of obfuscated premium channel signals that can be easily synchronized to signals generated in a television set in the residence of a person who is not a subscriber to the premium channel service.

It is another object of the invention to provide a piracy prevention device and method that programmably, addressably, irrecoverably obfuscates premium channel signals in a cable television system.

SUMMARY OF THE INVENTION

Briefly described, and in accordance with one embodiment thereof, the invention provides an obfuscation device and method for use in a cable television system, the obfuscation device including a channel status memory in which a plurality of channel status bits are stored, a frequency selection device for sequentially selecting frequency numbers that each correspond both to a selected one of a plurality of signal frequencies and to an address of the channel status memory in which the channel status bits corresponding to the selected frequency are stored. The channel status bits indicate whether each particular residence coupled by means of a drop cable to a main cable carrying unobfuscated program signals is authorized to receive a channel in which a frequency corresponding to the selected frequency number lies. In one described embodiment of the invention, a microprocessor executes a program that sequentially selects the frequency numbers in increasing order up to a maximum and then in decreasing order down to a minimum at a sufficiently high rate to ensure that the entire range of frequency numbers are selected at least once, but preferably 20 to 25 times, during a frame time of any television set served by the cable television system. The microprocessor executes a program to randomly or pseudo-randomly control the timing of the outputting of the respective signal frequencies to a phase locked loop circuit that generates an obfuscation signal having a frequency corresponding to the presently selected frequency number. A random or pseudo-random modulation signal is produced by a circuit that applies the modulation signal to the voltage control input of a voltage controlled oscillator contained in the phase locked loop circuit to cause random or pseudo-random modulation of the frequency of the obfuscation signal produced by the phase locked loop circuit. In operation the addressing of a location of the channel status memory in response to the selected frequency number causes fetching of channel status bits indicating whether each of the residences connected by drop cables is authorized to receive the channel in which the frequency of the presently obfuscation signal lies. The channel status bits are used to generate control signals that are applied to RF switches that prevent the present obfuscation signal from being superimposed on the program signals being conducted by the drop cables to the authorized residences. The obfuscation signal is superimposed on the program signals being conducted by the remaining drop cables to residences that are not authorized to receive the channel in which the frequency of the present obfuscation signal lies. The random or pseudo-random timing of the occurrence of the obfuscation signals and the random or pseudo-random frequency variation of the obfuscation signals makes it very difficult, or perhaps impossible for would-be pirates to synchronize the obfuscation signals with their television sets and selectively filter out the obfuscation signal from the program signals or otherwise obtain a useable program signal of an unauthorized channel.

In one described embodiment of the invention, the frequency numbers are not selected by the execution of a program by the microprocessor, but instead are generated by a hardware up/down counter. In this case, the timing of the counting of the up/down counter is randomly or pseudo-randomly varied in response to a circuit that includes a pseudo-random pulse generating circuit. A random noise diode circuit can be utilized to impart true randomness to the pseudo-random timing signals generated by the pseudo-random pulse generating circuit.

In the described embodiments of the invention, the contents of the channel status memory are periodically (for example, once per day) updated by means of commands formatted as FSK signals on the main cable. A suitable band pass filter, a FSK receiver, and a universal asynchronous receiver transmitter coupled between the microprocessor data bus and the main cable perform the function of receiving and formatting the commands for use by the microprocessor, which then updates the contents of selected locations in the channel status memory.

BRIEF DESCRIPTION OF THE DRAWINGS

FIGS. 1A–1C constitute a block diagram of the obfuscation signal device of the present invention.

FIG. 2 is a block diagram of a circuit that can be utilized to replace a portion of the circuitry of FIG. 1A to provide an alternate embodiment of the invention.

FIG. 3 is a circuit diagram of a directional coupler utilized in the embodiment of the invention shown in FIGS. 1A–1C.

FIG. 4 is a schematic diagram of an RF switch utilized in the embodiment of the invention shown in FIGS. 1A–1C.

FIG. 5 is a diagram illustrating the timing relationship of various signals occurring in the embodiments of the invention shown in FIGS. 1A–1C, and is useful in explaining the operation of the invention.

FIGS. 6A and 6B are flow charts of subroutines executed by the microprocessor of FIG. 1A in accordance with the present invention.

FIG. 7 is a schematic diagram of the low pass filter shown in FIG. 1C.

DESCRIPTION OF THE INVENTION

Figure 1B:
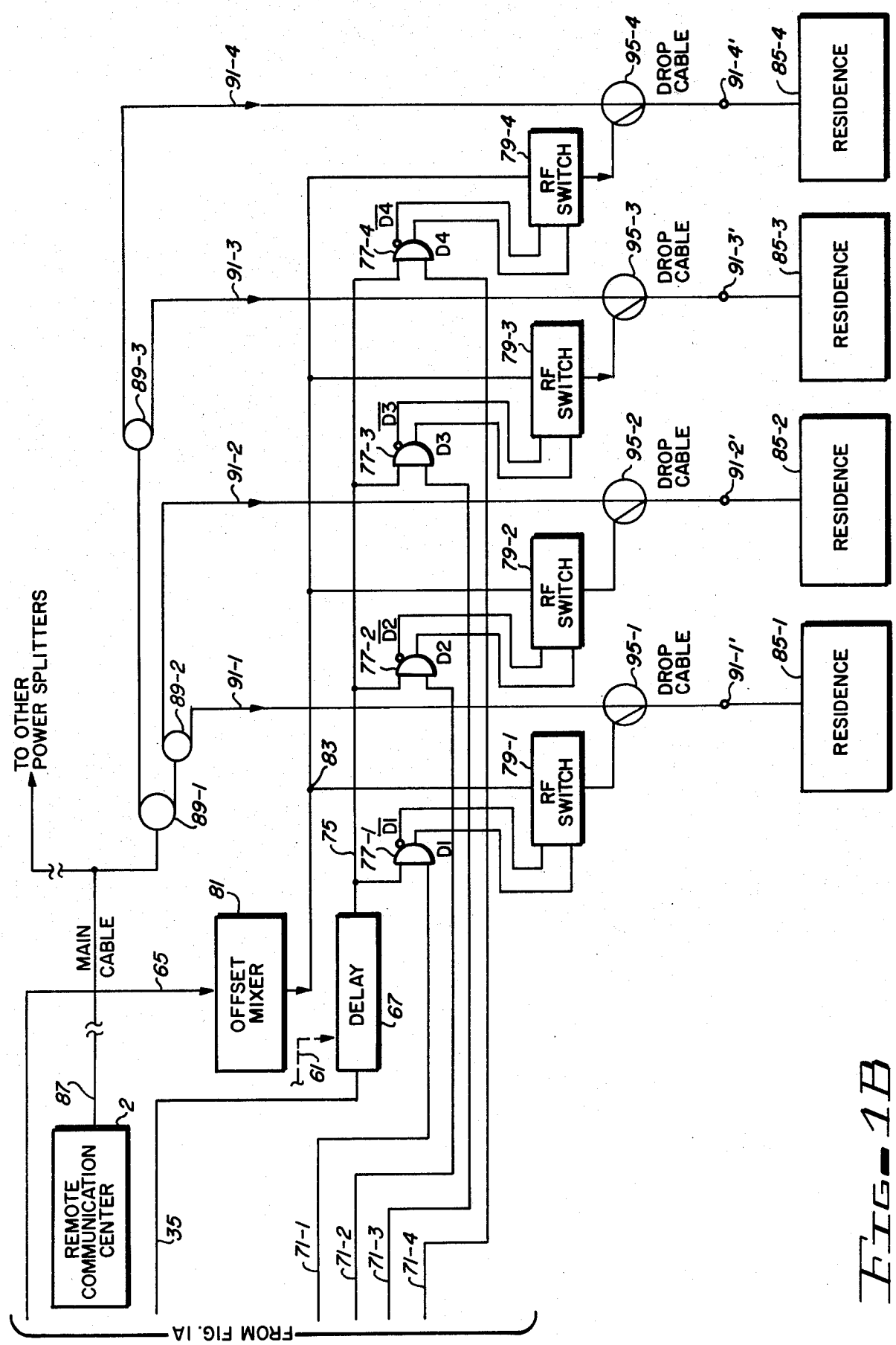
Figure 1C:
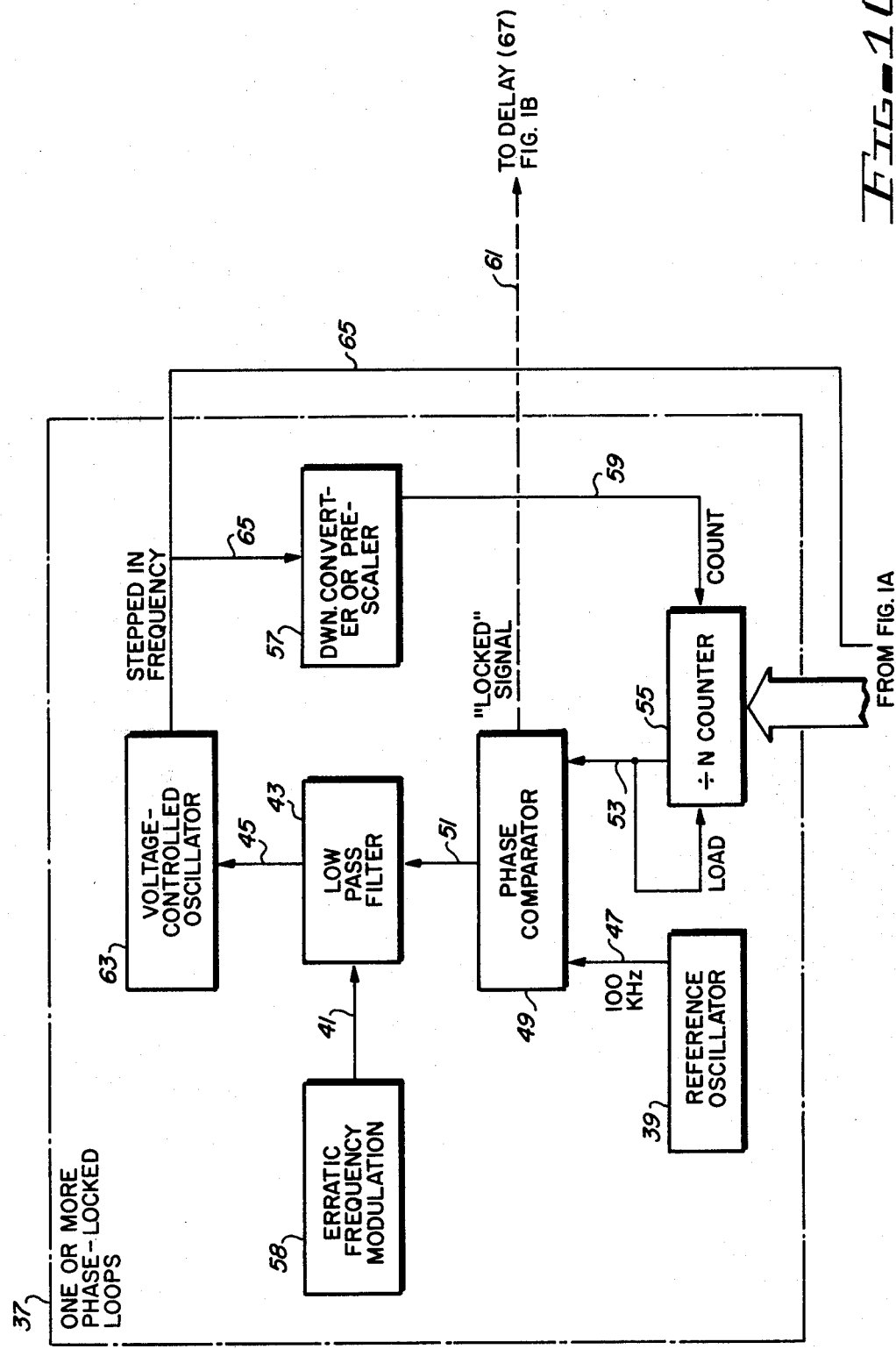

FIGS. 1A–1C constitute a block diagram of obfuscation device 1, which is coupled to four drop cables 91-1, 91-2, 91-3, 91-4. Each of the above-mentioned drop cables is coupled by means of a power splitter to a main cable 87. All program signals available to subscribers of a cable television company are conducted on main cable 87, which is driven by conventional electronic equipment in a remote communication center designated by reference numeral 2. Power splitters, such as 89-1, 89-2, and 89-3, are coupled to main cable 87 to allow program signals to be conducted via drop cables to the residences of subscribers. In FIG. 1B, power splitter 89-1 has its input connected to main cable 87, one output connected to the input of power splitter 89-2, and another output connected to an input of power splitter 89-3. One output of power splitter 89-2 is connected to cable 91-1, and another output of power splitter 89-2 is connected to an input of cable 91-2. One output of power splitter 89-3 is connected to cable 91-3, and another output of power splitter 89-3 is connected to cable 91-4. Power splitters such as 89-1, 89-2 and 89-3 are widely available, as they are commonly used to couple drop cables to main cables of cable television systems.

In conventional cable television systems, drop cables such as 91-1, 91-2, 91-3 and 91-4 are routed to separate subscriber residences, so that all of the channel signals available on a main cable such as 87 appear in the residences of the respective subscribers. However, in accordance with the present invention, each of drop cables 91-1, 91-2, 91-3, and 91-4 are connected to one input of respective ones of directional couplers 95-1, 95-2, 95-3 and 95-4. The outputs of directional couplers 95-1 95-2, 95-3 and 95-4 are respectively connected to drop cables 91-1', 91-2', 91-3', and 91-4'. (Directional couplers 95-1, 95-2, etc. can be implemented by means of the circuit shown in FIG. 4). The drop cables 91-1', 91-2', etc. then are routed into the respective subscriber residences 85-1, 85-2, 85-3 and 85-4 and are coupled to television sets therein.

In accordance with the present invention, the pure program signals for each of the channels included in the previously described "basic service" are conducted unchanged from input cables 91-1, 91-2, 91-3, and 91-4 through the directional couplers to drop cables 91-1', 91-2', 91-3', and 91-4, respectively.

In accordance with the present invention, "pure" program signals for the previously described "premium channels" also are conducted from remote communications center 2 via main cable 87 to drop cables 91-1, 91-2, etc. The subsequently described circuitry allows the pure premium channel signals to pass through directional couplers 95-1, 95-2, etc., respectively, to drop cables 91-1', 91-2', etc. only to the residences of authorized subscribers to the premium channel service. The obfuscation device 1 of the present invention causes "random" (with respect to frequency) obfuscation signals to be "randomly" (with respect to time) superimposed on the pure premium channel signals conducted by drop cables 91-1, 91-2, etc. so that randomly obfuscated premium channel signals appear on the ones of drop cables 91-1', 91-2', etc. that are conducted to the residences of unauthorized subscribers.

The basic components of obfuscation device 1 include microprocessor 3, a random access memory 25 that contains all "channel status bits" indicating whether or not the residences 85-1, 85-2, etc. are authorized to receive every channel for which program signals are conducted on main cable 87 (although only four drop cables connected to residences are shown in FIGS. 1A–C for purposes of illustration, in practice, hundreds of drop cables and residences can be similarly coupled to a main cable). Obfuscation device 1 also includes a phase locked loop circuit 37 that receives "frequency selection numbers" from microprocessor 3 and correspondingly generates random (with respect to frequency) obfuscation signals on obfuscation signal conductor 65'. As subsequently explained, an offset mixer can be used to "divide down" the signal on conductor 65' to produce a desired obfuscation frequency signal on conductor 83. Obfuscation device 1 also includes a plurality of RF (radio frequency) switches 79-1, 79-2, etc. that selectively gate the above-mentioned obfuscation signal on conductor 83 to "tap inputs" of directional couplers 95-1, 95-2, etc. in order to accomplish the selective superimposing of the obfuscation signal onto the pure program signals of those drop cables determined by channel status bits fetched from channel status memory 25 to be unauthorized to receive the channel in which the present obfuscation signal lies.

The channel status bits are written into channel status memory 25 by means of microprocessor 3. The channel status commands are transmitted by means of main cable 87 from remote communication center 2 to microprocessor 3 by means of an FSK (frequency shift keyed) FM receiver 6 and a UART (universal asynchronous receiver transmitter 8).

Now that the basic structure of the frequency obfuscation device 1 has been described, the detailed structure will be described. Main cable 87 is connected to a 50.25 megahertz band pass filter 4, which can be easily implemented by those skilled in the art. The output of band pass filter 4 is connected to the input of FSK FM receiver 6, which can be easily implemented by means of either a Motorola MC3357 or MC3359 integrated circuit. The output of FSK receiver 6 is connected to the input of UART 8. A control output of UART 8 is connected to an interrupt request input of microprocessor 3, and the parallel outputs of UART 8 are connected to corresponding conductors of data bus 11, which is also connected to microprocessor 3. Microprocessor 3 can be implemented by means of an Intel 8049 8-bit microprocessor.

The respective conductors of data bus 11 are connected to the data input/output terminals of channel status memory 25, which can be implemented by means of two Intel 5101 256 word by 4-bit random access memory integrated circuits. A read output of microprocessor 3 is connected by means of conductor 9B to a read input of channel status memory 25. A write output of microprocessor 3 is connected by means of conductor 9A to a write input of channel status memory 25. The conductors of data bus 11 are connected to the respective inputs of channel status register 69, which can be implemented by means of any suitable latch circuit, a wide variety of which are available from integrated circuit manufacturers. The four outputs of the four bits of channel status register 69 are designated 71-1, 71-2, 71-3 and 71-4. Channel status register output 71-1 is connected to one input of gate 77-1, which has an inverting and a non-inverting output, both connected to RF switch 79-1. Similarly, channel status register outputs 71-2, 71-3, and 71-4 are respectively connected to inputs of gates 77-2, 77-3 and 77-4. Each of gates 77-2, 77-3 and 77-4 has both an inverting and a non-inverting output connected to the corresponding RF switch. The other inputs of gates 77-1, 77-2, etc. are respectively connected to conductor 74. The non-inverting output produces the logical AND function of the inputs of gates 77-1, 77-2, etc. and the inverting outputs produce a logical NAND function of the inputs of the respective gates.

Conductor 75 is connected to the output of a delay circuit 67, the input of which is connected to conductor 35. Conductor 35 is connected to a decode circuit 24, subsequently described.

Microprocessor 3 outputs a selected number "N" on data bus 11. N represents the frequency of an obfuscation signal to be generated by obfuscation device 1. The number N, or at least a portion of N, is also utilized as an address to be applied to the address input terminals of channel status memory 25. Both data and memory addresses are outputted by microprocessor 3 onto data bus 11. If the number outputted is an address, microprocessor 3 outputs an ALE signal on conductor 35 to cause that number (N in this case) to be loaded from data bus 11 into an address latch circuit 26. (Address latch circuit 26 can be implemented by means of an Intel 8112 integrated circuit.)

In addition to outputting the 8-bit number N onto data bus 11, microprocessor 3 also outputs a 4-bit number on input/output port 30. This 4-bit number and the 8-bit number N in address latch 26 are provided as inputs to a 12-bit decode circuit 24. Decode circuit 24 produces a number of output signals to control various other circuits in obfuscator device 1, as subsequently described. The number N stored in address latch 26 is outputted to eight of the address inputs of channel status memory 25. The four bits on I/O bus 30 also are applied as address inputs to channel status memory 25. The eight conductors of data bus 11 also are connected to an input of an 8-bit register 27, referred to as "N holding register" 27. Data bus 11 also is connected to the inputs of channel status register 69.

It should be noted that the eight bits of each word outputted on data bus 11 are address bits to be applied to address inputs of channel status memory 25. One of the four bits outputted on I/O port 30 by microprocessor 3 also is used as an address bit, and the other three bits outputted on I/O port 30 are decoded by decode circuit 24. The entire 8-bit number N loaded into N holding register 27 is utilized to select the frequency of the next obfuscation signal to be generated by phase locked loop circuit 37.

One of the outputs of decode circuit 24 is supplied via conductor 35 as an input to delay circuit 67, which provides sufficient delay to ensure that the phase locked loop circuit 37 has completed generation of the selected obfuscation signal before the RF switches 79-1, 79-2, etc. are enabled by any of the channel status bits that are logical "ones". Another output of decode circuit 24 is produced on conductor 24C as a memory enable signal to channel status memory 25. Decode circuit 24 produces control output signals on conductors 24B and 24A that are applied to the data and status inputs, respectively, of UART 8. The read output of microprocessor 3 is conducted to the read input of UART 8. The write output of microprocessor 3 is connected to the write input of UART 8 and is also supplied as an input to decode circuit 24. Those skilled in the art can easily connect microprocessor 3, channel status memory 25, UART 8, address latch 26, and decode circuit 24 on the basis of detailed information disclosed in the "8048 User's Manual", dated August 1980, published by Intel Corporation, and the "Intel Component Data Catalog" dated 1981, also published by Intel Corporation. Detailed applications information for the Intel 8049 in conjunction with numerous circuits in the Intel product line are disclosed in these references, which are incorporated herein by reference.

The obfuscation signal produced on conductor 65 by phase locked loop circuit 37 will be enabled to pass through any of RF switches 79-1, 79-2, etc. that are coupled to one of the bits of channel status register 69 in which a logical "1" is stored. The precise time of turning on of the ones of RF switches 79-1, 79-2, etc. that are enabled by a channel status bit that is equal to a logical "1" is determined by the timing of the signal produced on conductor 35 and the duration of the delay of that signal caused by delay circuit 67. As subsequently explained, the timing is such as to cause the enabled RF switches to pass the obfuscation signal on conductor 83 at times that are erratic, or random or "pseudo-random" (i.e., unsynchronizable) with respect to the horizontal and/or vertical sweep signals of the television sets to which the various drop cables 91-1', 91-2' etc. are coupled. This feature makes it extremely difficult for a would-be pirate to synchronize the obfuscation signal superimposed on the program signal on those drop cables with the operation of circuitry in the television set in order to eliminate the obfuscation signal from the program signal in such a manner as to allow an acceptable television picture to be produced.

Those skilled in the art can provide numerous different types of subroutines that can be executed by microprocessor 3 in order to provide random or pseudo-random timing of the loading of the select numbers N into decode circuit 24. One approach would be to store a pseudo-random number table in an internal memory of microprocessor 3. Another approach would be to simulate the performance of a shift register that exclusively OR's several outputs and feeds the result back into the register being simulated.

Holding register 27 of FIG. 1A can be implemented by means of any suitable register, such as a Texas Instruments 74LS160 integrated circuit register. The outputs of N holding register 27 are respectively coupled to the inputs of a "divide by N" counter 55, which can be implemented by means of Texas Instruments 74LS169 up/down integrated circuit counters. A suitable output bit of divide by N counter 55 is connected to one input of a phase comparator circuit 49, which can be implemented by means of Motorola MC14046 CMOS integrated circuit comparators. The other input of phase comparator 49 is connected to conductor 47 which, in turn, is connected to the output of a 100 kilohertz reference oscillator 39. Reference oscillator 39 is a very conventional circuit that can be easily implemented by those skilled in the art and need not be further discussed. The output of phase comparator 51 is connected to one input of a low pass filter circuit 43, the details of which are shown in FIG. 7.

Referring to FIG. 7, the input of low pass filter 43 is connected to the output 51 of phase comparator circuit 49. Resistor 43A and capacitor 43C constitute a low pass filter section that produces a slowly varying DC signal on conductor 46. Resistors 43D and 43E, in conjunction with capacitor 46, form a damping circuit that prevents overshoot of the signal appearing at node 46 to produce a signal on conductor 45 that has no overshoot. Resistor 43B is coupled between conductor 41 and conductor 45 to superimpose an erratic frequency modulation signal on conductor 45, whichis provided as the control input of voltage control oscillator 63.

Erratic frequency modulation circuit 58 of FIG. 1C generates the erratic frequency modulation signal on conductor 41. Circuit 58 can be implemented by means of a National Semiconductor MM5837 digital noise circuit integrated circuit having its output fed by means of a noise gate device to one input of an amplifier. This causes a random or pseudo-random variation in the slowly varying DC level on conductor 45, and thereby causes the frequency of output signal produced by voltage controlled oscillator 63 to be randomly modulated about a carrier frequency determined by the number N. A frequency modulation of approximately one megahertz has been found to satisfactorily obfuscate the images produced by the pure program signals.

Voltage controlled oscillator circuit 63 can be implemented by means of a Motorola MC1648 voltage control oscillator integrated circuit.

The output of voltage controlled oscillator 63 is connected conductor 65, which is connected to an input of "divide by ten" prescaler circuit 57, which can be implemented by means of a Fairchild 11C90 emitter coupled logic integrated circuit prescaler. The output of prescaler circuit 57 is connected by means of conductor 59 to "increment/decrement" input of up-down counter 55. Conductor 65 is also connected to an input of offset mixer 81. Mixers such as offset mixer 81 are conventional circuits that can be readily selected from among a wide variety of commercially available devices.

Channel status commands sent from remote communication center 2 to microprocessor 3 via main cable 87 are serial in nature and take the form of FSK (frequency shift keyed) signals that create marks and spaces that represent logical "ones" and "zeros". The FSK signals are received by a 50.25 megahertz band pass circuit 4, which has its input connected to main cable 87. Band pass filter 4 is a highly conventional circuit that can be implemented in a wide variety of ways by those skilled in the art. The output of band pass filter 4 is connected to an input of FSK FM receiver 6, which can be implemented by means of a Motorola MC3357 or MC3359 integrated circuit to produce the series of sequential "ones" and "zeros" that can be interpreted by UART 8. UART 8 can be implemented by means of a Harris 6402 CMOS UART. The control output of UART 8 is connected to the interrupt request input of microprocessor system 3. The data outputs of UART 8 are connected to corresponding conductors of data bus 11.

A circuit for implementing the RF switches 79-1, 79-2, etc. is shown in FIG. 4 with typical component values indicated. The operation of the circuit of the previously mentioned directional RF switch 79-1, shown in FIG. 4 is quite straightforward. If the non-inverting output produced by gate 77-1 is at a high level, such as +10 volts, then the inverting output of that gate will be at a low level, for example −10 volts. In this event, diodes D1, D2, and D3 are reverse biased and diodes D4 and D5 are forward biased. Therefore, the obfuscation signal on conductor 83 is passed from conductor 83 to the upper input of directional conductor 95-1. If the non-inverting output of gate 77-1 is at −10 volts, then the inverting output of gate 77-1 will be at +10 volts. This causes D4 and D5 to be reversed biased, and forward biased diodes D1, D2 and D3. This condition causes the signal on conductor 83 to be blocked from passing to conductor 91-1. The values of the resistors and capacitors of directional coupler 79-1 of FIG. 4 are shown to make the above-described operation clearer to one skilled in the art.

Previously mentioned offset mixer 81 is optional, as indicated by the dotted lines designated by reference numeral 81, and is utilized if the phase locked loop circuit 37 is operated to produce frequencies on conductor 65 that are greatly in excess of 400 megahertz, which is the maximum frequency of the highest available television channel(Channel 55). By utilizing a local oscillator that is contained in offset mixer 81, the frequency produced on conductor 65 by voltage controlled oscillator 63 is divided down to the desired obfuscation frequency required on conductor 83 to effectively obliterate or obfuscate the program signal appearing on the channel represented by the most recently selected number N. This approach can be advantageous in eliminating harmonic frequencies of the obfuscation signal produced for the lower numbered channels. (Such harmonics might interfere with authorized reception of higher numbered channels.) Offset mixer 81 can be one of the types of mixers commonly used to convert TV cable signals from high frequencies into the lower frequencies that need to be supplied to the rf terminals of the television sets.

FIG. 2 shows alternate circuitry that can be utilized to replace the portion of FIG. 1A that generates the above-described N numbers. The circuit of FIG. 2 can be utilized if the particular microprocessor 3 utilized cannot operate fast enough to generate the new N numbers at the desired rate (so that all values of N are selected at least once, although 20 to 25 times is preferable, each frame time of television sets served by the cable television system) and does not have the ability to execute a pseudo-random number generating program of the type mentioned above to produce random timing of the generated N numbers. If this is the case, an up/-down counter 17, which can be implemented by means of Texas Instruments 74LS169 up/down integrated circuit counters, can be utilized instead to generate the N numbers. An erratic oscillator 36, which can be implemented by means of one or more National Semiconductor 5837 pseudo-random signal generator integrated circuits, generates the random clock signal needed to "erratically" increment and decrement up/down counter 17. The outputs 34' of up/down counter 34 are connected to the inputs of N holding register 27 and also to one set of inputs of multiplexer circuit 38, which can be readily implemented by means of a wide variety of integrated circuit multiplexers that are commercially available. The outputs 32 of address latch 26 and the I/O port lines 30 are connected into the other set of inputs of multiplexer 38. The write output 9A of microprocessor 3 is connected to the write input of channel status memory 25 and to the control input of multiplexer 38 in order to cause multiplexer 38 to route the outputs of up/down counter 17 to multiplexer outputs 40 at all times except during a memory write cycle, in which case, the address outputted by address latch 26 is coupled to multiplexer output conductors 40 to effect writing of new values of channel status bits into channel status memory 25. Typically, the values of channel status bits in channel status memory might be updated once per day, in a non-interactive cable television system. In an interactive cable television system, more frequent updating of channel status bits in channel status memory 25 might be effected.

FIG. 6A discloses a flow chart of the operations executed by microprocessor 3 in response to a command received from remote communications center 2 to modify the contents of channel status memory 25. FIG. 6B is a flow chart of the operations executed by microprocessor 3 to generate the N numbers in the embodiment of FIGS. 1A–1C.

Referring now to FIG. 6A, label 103 represents reception of a command from a remote communications center 2 to modify the contents of channel status memory 25. The command can take two forms. The first form is "clear frequency N for drop cable number D". This means that the channel status bit is to be set to an "0" for the frequency channel represented by N on drop cable represented by bit D (which may be the bit corresponding to, for example, any one of conductors 71-1, 71-2, 71-3 or 71-4) of the data word in channel status memory 25. The second form of the command is "obfuscate frequency for drop cable number D".) This means that the channel status bit is set to a "1" in the data word bit corresponding to the channel frequency represented by N and drop cable number D.

In block 104, microprocessor 3 sets the channel status memory address (which is applied via buses 32 and 30 to the address inputs of channel status memory 25) to the value of N contained in the command. Microprocessor 3 then reads the value of the words stored in the addressed location of channel status memory 25 and sets a variable called "M DATA" equal to the value of the 4-bit word fetched from channel status memory 25. Then microprocessor 3 sets a variable called "P DATA" equal to the value of "M DATA".

Then microprocessor 3 goes to decision block 105 and determines whether the command received in label 103 of FIG. 6A is a "clear" command or an "obfuscate" command. If it is a clear command, the program enters block 106 and sets bit D of the variable "P DATA" equal to a logical "0" and enters block 108. However, if the subject command is an obfuscate command, the program enters block 107 and sets bit D of the word "P DATA" to a logical "1". The program then enters block 108. In block 108, the program writes the new value of the word "P DATA" into the location of channel address memory 25 presently addressed (by the number N being applied to its address inputs), thereby updating the channel status bit referred to by the command. The program then exits the obfuscator command subroutine of FIG. 6A.

Referring next to FIG. 6B, the program enters the routine for generating a new number N at label 109. The program goes from label 109 to decision block 110 and determines the status of a direction flag that indicates whether an internal software counter of microprocessor 3 is being incremented or decremented. If the software counter is being incremented, the program enters block 111 and sets the contents N of the software counter equal to N+1, i.e., increments the software counter. The program then goes to decision block 113 and determines if the present value of N is the maximum value, i.e., 400, corresponding to 400 megahertz (corresponding to TV Channel 55). If the present value of the subject software counter is the maximum permissible value, the program goes to block 114 and sets the above-mentioned direction flag to a state that indicates that the software counter is to begin counting down, rather than up. In either case, the program goes to block 117.

If it is determined in decision block 110 that the software counter should be counting down, the program goes to block 112 and sets the contents of the software counter equal to N−1, i.e., decrements the software counter. The program then goes to decision block 115 and determines if the present value of N is the minimum value, for example, 54, corresponding to 54 megahertz (corresponding to TV Channel 0). If so, the program sets the above-mentioned direction flag to a state that indicates the software counter should begin counting up. In either case, the program enters block 117. In block 117, microprocessor 3 causes decoder 24 to produce a signal on conductor 35 that ultimately causes the strobe signal on conductor 75 to disable all of the RF switches 79-1, 79-2, etc. The program then goes to block 118 and causes microprocessor 3 to output the new value N on data bus 11. As indicated in block 119, this new value of N is caused to be loaded into holding register 27 in response to a signal on conductor 52. The signal on conductor 52 is produced by decoder 24 in response to information received from microprocessor 3.

Note that when the new value of N is entered into holding register 27, N becomes available for use by phase locked loop circuitry 37, which begins to go through a series of well known operations necessary to cause a new frequency having the value N (or a multiple thereof) to be generated on conductor 65.

Referring to block 120 of FIG. 6B, after enough time has been allowed for channel status memory 25 to be accessed so that the channel status bits of the word corresponding to the new number of N appear at the inputs of channel status register 69, the program goes to block 121 and sets the contents of the channel status register 69 equal to the value of the word being presented at the inputs of channel status register 69 by causing an appropriate load signal to be produced on conductor 35 in response to microprocessor 3.

Next, the program goes to decision block 122 and waits until the phase locked loop circuitry 37 has "re-locked". The amount of time waited can be determined by the program stored in microprocessor 3 or, preferably, a "lock" signal output produced by phase comparator 49 of FIG. 1C on conductor 61 can be operated on by delay circuit 69 to allow the above-mentioned strobe pulse on conductor 75 to be produced as soon as the phase locked loop circuit is "re-locked". The program then goes to block 123 and generates, at a pseudo-random time, as previously explained, a pulse on conductor 50 that results in generation of the RF switch strobe pulse on conductor 75, thereby blocking the new obfuscation signal having a carrier frequency equal to new value of N from being mixed or superimposed upon the corresponding channel frequency conducted to those residences connected to drop cables for which a logical "zero" is stored in channel status register 69 and causing the obfuscation signal on conductor 83 to be superimposed upon the corresponding program signal on those drop cables for which a logical "one" is stored in channel status register 69.

FIG. 5 shows a timing diagram that illustrates the operation of the obfuscation device of FIGS. 1A to 1C. The upper diagram of FIG. 5 indicates the value of N contained in the above-mentioned software counter. Assuming the lower limit for the software counter is 54 and the upper limit is 400, the "steps" in the diagram show how the software counter is sequentially "counted up" and "counted down".

The second diagram in FIG. 5 shows the waveform of a signal appearing on conductor 83 of FIG. 1B. This signal is the obfuscation signal generated by or in response to phase locked loop circuitry 37. The third diagram in FIG. 5 shows the RF switch strobe signal appearing on conductor 75 of FIG. 1B. The random or pseudo-random timing of the RF switch strobe signal on conductor 75 is illustrated by the varying spaces between the pulses shown in FIG. 5. The random gating of the obfuscation signal onto the drop cables is illustrated in the last waveform shown in FIG. 5, wherein the X's indicate the times during which the program signal is obfuscated at the frequency indicated by the graph of N.

It should be recognized that the step counting sequence indicated by the graph of N in FIG. 5 for the above-mentioned software counter also can be accomplished by the high speed up/down hardware counter 34 of FIG. 2. It should also be appreciated that it is not necessary that the software counter (or hardware counter) generate precisely the same stepped counting sequence shown in FIG. 5. In fact, any other sequence would be satisfactory as long as appropriate obfuscation signal frequencies occur in every channel frequency range repetitively counted at a sufficiently rapid rate that the program signal in each channel frequency range becomes obfuscated often enough to make the resulting television picture image relatively unviewable.

While the invention has been described with reference to a particular embodiment thereof, those skilled in the art will be able to make various modifications to the described embodiment of the invention without departing from the true spirit and scope thereof.

What is claimed is:

1. A method of preventing piracy of television programs supplied by a cable television system including a communication center applying to a main cable a plurality of program signals each having a frequency range within a respective one of a plurality of respective channels, various residences being authorized to receive various ones of the programs represented by said program signals, said cable television system also including a plurality of drop cables coupled to said main cable for delivering said program signals to said residences, said method comprising the steps of:
   (a) loading an addressable memory with a plurality of channel status bits, each of said channel status bits having a state that represents the authorization or non-authorization of a particular one of said residences to view a program on a particular one of said channels;
   (b) selecting an obfuscation signal frequency that is within a selected one of said channels, said obfuscation signal frequency being one of a plurality of obfuscation frequencies that are within respective ones of said channel frequency ranges, said memory having a plurality of addressable locations each corresponding to a respective one of said obfuscation signal frequencies, each of said addressable locations containing a plurality of said channel status bits respectively representing the authorization or non-authorization of respective ones of said residences to view the programs on respective ones of said channels;
   (c) generating an obfuscation signal having a carrier frequency equal to the obfuscation signal frequency selected in accordance with step (b);
   (d) addressing the location of said memory corresponding to said obfuscation signal frequency selected in accordance with step (b) to obtain the channel status bits therefrom;
   (e) superimposing said obfuscation signal of step (c) onto the program signals conducted by the ones of said drop cables coupled to television sets in the ones of said residences indicated by the channel status bits obtained in step (d) to be not authorized to view the program represented by the program signals of the channel in which the obfuscation signal frequency selected in accordance with step (b) lies; and (f) repeating steps (b) through (e) for another of said channels.

2. The method of claim 1 wherein in step (d) all of said program signals not having frequencies in the channel in which said selected obfuscation frequency lies, are conducted in unobfuscated form by said drop cables to said respective residences.

3. The method of claim 2 wherein prior to step (f), steps (b) through (e) are repeated for another obfuscation signal frequency that is within the channel selected in step (b).

4. The method of claim 1 including using a processor to effect said loading of said memory.

5. The method of claim 4 including the step of transmitting commands each containing information representing an address of said memory and a desired state of one of said channel status bits from said communication center along said main cable to said processor.

6. The method of claim 5 wherein said commands are transmitted along said main cable in FSK format, said method including the steps of using an FSK receiver to convert said commands to marks and spaces and using a UART to convert said marks and spaces to parallel format for use by said processor.

7. The method of claim 1 wherein step (a) is performed only often enough to update said memory to include changes in subscriber authorization status.

8. The method of claim 1 wherein the timing of said generating of said obfuscation signal in step (c) is erratically determined.

9. The method of claim 1 wherein step (c) includes randomly or pseudo-randomly modulating the frequency of said obfuscation signal within a predetermined range about said obfuscation signal frequency.

10. The method of claim 8 wherein step (b) includes using a processor to select obfuscation signal frequencies in order of increasing frequency up to a maximum, and then in order of decreasing frequency down to a minimum.

11. The method of claim 8 wherein step (b) includes using a hardware up/down counter and a pseudo-random pulse generator circuit to select said obfuscation signal frequencies and to produce said pseudo-random timing, respectively.

12. The method of claim 9 including using a phase locked loop circuit to effect generating the obfuscation frequency of step (c).

13. The method of claim 12 wherein said phase locked loop circuit includes a voltage controlled oscillator, said method including generating a randomly or pseudo-randomly, slowly varying signal and applying that signal to a voltage control input of said voltage controlled oscillator to effect said modulating of the frequency of said obfuscation signal about said carrier frequency.

14. In a cable television system including a main cable for conducting a plurality of program signals each having a frequency range within various ones of a plurality of channel frequency ranges, a plurality of drop cables coupled to said main cable for delivery of said plurality of program signals to respective ones of a plurality of residences, wherein various ones of said residences are authorized to receive only certain ones of the television programs represented by said plurality of programs signals, a theft prevention device for preventing unobfuscated reception of television programs for said residences, said program theft prevention system comprising in combination:

(a) first means for storing a plurality of channel status bits, the state of each of said channel status bits corresponding to the authorization or non-authorization of a particular one of said residences to view a program on a particular one of said channels, said first means being addressable to effect fetching of a one of said channel status bits corresponding to a particular one of said channels;

(b) second means for sequentially generating a plurality of obfuscation signals, said plurality of obfuscation signals having frequencies that lie within respective ones of said channel frequency ranges;

(c) third means for selecting the carrier frequency of a present obfuscation signal, said present obfuscation signal being the one of said obfuscation signals next to be generated by said second means, said second means being responsive to said third means to generate said present obfuscation signal at said selected carrier frequency;

(d) fourth means responsive to said third means for addressing a location of said first means represented by said selectively determined frequency to fetch the channel status bits corresponding to one of said channels; and (e) fifth means responsive to said second means and said fourth means for superimposing said present obfuscation signal onto the program signal being conducted by drop cables connected to ones of said residences not authorized to receive the television program represented by the program signal conducted by those drop cables.

15. The theft prevention device of claim 14 wherein said second means includes sixth means for erratically modulating the frequency of one of said obfuscation signals about the selected carrier frequency of that obfuscation signal.

16. The theft prevention device of claim 15 wherein said second means includes a phase locked loop circuit, said phase locked loop circuit including a voltage controlled oscillator for generating said obfuscation signals, said sixth means producing an erratically, slowly varying signal and applying that erratically, slowly varying signal to a voltage control input of said phase locked loop circuit to cause said erratic modulating of the frequency of said obfuscation signal.

17. The theft prevention device of claim 14 wherein said third means includes sixth means for coupling said selected frequency to said second means at erratically varying times.

18. The theft prevention device of claim 17 wherein said third means is included in a processor that executes a routine to select said frequencies of said obfuscation signals and said erratically varying times.

19. The theft prevention device of claim 14 wherein said third means includes up/down hardware counter means for producing the frequency of a present obfuscation signal at erratic times.

20. The theft prevention device of claim 14 including a processor for effecting loading of said channel status bits into said first means, and means for receiving commands and information to update said channel status bits in serial format from said main cable and converting said commands and information into a parallel format for use by said processor.

21. The theft prevention device of claim 14 wherein said fifth means includes an RF switch for selectively passing or blocking said obfuscation signals and mixing means coupled to said RF switch and to said main cable for effecting said superimposing of said present obfuscation signal onto the program signal being conducted by one of said drop cables if one of said fetched channel status bits for the residence to which said drop cable is connected has a first logic state, and preventing said superimposing if said fetched channel status bit has a second logic state.

22. The theft prevention device of claim 14 wherein said first means includes a random access memory having a plurality of word locations each corresponding to a different one of the obfuscation signal frequencies that can be selected by said third means, each of said words including a plurality of bits that correspond to respective ones of said drop cable.

23. A method of preventing piracy of television programs supplied by a cable television system including a communication center applying to a main cable a plurality of program signals each having a frequency range within a respective one of a plurality of respective channels, various residences being authorized to receive various ones of the programs represented by said program signals, said cable television system also including a plurality of drop cables coupled to said main cable for delivering said program signals to said residences, said method comprising the steps of:

(a) loading an addressable memory with a plurality of channel status bits, each of said channel status bits having a state that represents the authorization or non-authorization of a particular one of said residences to view a program on a particular one of said channels, said memory having a plurality of addressable locations each corresponding to a respective one of said channels, each of said addressable locations containing a plurality of said channel status bits respectively representing the authorization or non-authorization of respective ones of said residences to view programs on respective ones of said channels;

(b) selecting one of said channels for which an obfuscation signal is needed;

(c) generating an obfuscation signal for obfuscating one of said program signals in the selected channel;

(d) addressing the location of said memory corresponding to the channel selected in accordance with step (b) to obtain the channel status bits therefrom;

(e) superimposing said obfuscation signal of step (c) onto the program signals conducted by the ones of said drop cables coupled to television sets in the ones of said residences indicated by the channel status bits obtained in step (d) to be not authorized to view the program represented by the program signals of the selected channel; and (f) repeating steps (b) through (e) for another of said channels.

* * * * *